(12) United States Patent
Lin et al.

(10) Patent No.: US 11,955,026 B2
(45) Date of Patent: Apr. 9, 2024

(54) MULTIMODAL NEURAL NETWORK FOR PUBLIC SPEAKING GUIDANCE

(71) Applicant: International Business Machines Corporation, Armonk, NY (US)

(72) Inventors: Cheng-Fang Lin, New Taipei (TW); Ching-Chun Liu, Taipei (TW); Ting-Chieh Yu, Taipei (TW); Yu-Siang Chen, Chiayi (TW); Ryan Young, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 630 days.

(21) Appl. No.: 16/583,339

(22) Filed: Sep. 26, 2019

(65) Prior Publication Data

US 2021/0097887 A1 Apr. 1, 2021

(51) Int. Cl.
| | |
|---|---|
| *G09B 19/04* | (2006.01) |
| *G06N 3/08* | (2023.01) |
| *G10L 15/22* | (2006.01) |
| *G10L 17/02* | (2013.01) |
| *G10L 17/18* | (2013.01) |

(52) U.S. Cl.
CPC ............... *G09B 19/04* (2013.01); *G06N 3/08* (2013.01); *G10L 15/22* (2013.01); *G10L 17/02* (2013.01); *G10L 17/18* (2013.01); *G10L 2015/227* (2013.01); *G10L 2015/228* (2013.01)

(58) Field of Classification Search
CPC ......... G09B 19/04; G10L 15/22; G10L 15/24; G10L 15/25; G10L 2015/225; G10L 2015/226; G10L 2015/227; G10L 2015/228; G10L 25/48; G10L 25/51; G10L 25/57; G10L 25/63
See application file for complete search history.

(56) References Cited

U.S. PATENT DOCUMENTS

| | | | |
|---|---|---|---|
| 7,050,978 B2 | 5/2006 | Silverstein | |
| 9,792,908 B1 * | 10/2017 | Bassemir | ............... G09B 19/04 |
| 9,984,682 B1 * | 5/2018 | Tao | ............... G10L 15/183 |
| 10,062,198 B2 | 8/2018 | Bhat | |

(Continued)

FOREIGN PATENT DOCUMENTS

CN 106847263 A * 6/2017 ............. G10L 15/02

OTHER PUBLICATIONS

Chollet et al., "Exploring Feedback Strategies To Improve Public Speaking: an Interactive Virtual Audience Framework", UbiComp '15 Adjunct, Sep. 7-11, 2015, Osaka, Japan, 13 pages.

(Continued)

*Primary Examiner* — Paras D Shah
(74) *Attorney, Agent, or Firm* — Stephen R. Yoder (57) ABSTRACT

A method, computer program product, and computer system for public speaking guidance is provided. A processor retrieves speaker data regarding a speech made by a user. A processor separates the speaker data into one or more speaker modalities. A processor extracts one or more speaker features from the speaker data for the one or more speaker modalities. A processor generates a performance classification based on the one or more speaker features. A processor sends to the user guidance regarding the speech based on the performance classification.

9 Claims, 6 Drawing Sheets

(56) References Cited

U.S. PATENT DOCUMENTS

| | | | | |
|---|---|---|---|---|
| 2011/0144990 | A1* | 6/2011 | Hoory | G10L 13/02 704/235 |
| 2014/0006326 | A1* | 1/2014 | Bazanov | G06N 5/02 706/46 |
| 2014/0297279 | A1 | 10/2014 | Miller | |
| 2014/0356822 | A1* | 12/2014 | Hoque | G09B 19/04 434/185 |
| 2015/0269857 | A1* | 9/2015 | Feng | G09B 7/00 434/353 |
| 2015/0339940 | A1* | 11/2015 | Aggarwal | G09B 7/02 704/235 |
| 2016/0049094 | A1 | 2/2016 | Gupta | |
| 2016/0170967 | A1* | 6/2016 | Allen | G10L 25/63 704/9 |
| 2016/0189556 | A1* | 6/2016 | Clark | G06F 40/103 434/362 |
| 2017/0169727 | A1* | 6/2017 | Briggs | G09B 5/06 |
| 2018/0336880 | A1 | 11/2018 | Arik | |
| 2019/0139447 | A1* | 5/2019 | Crawford | G10L 25/48 |
| 2019/0311331 | A1* | 10/2019 | Steinhoff | G06Q 10/1053 |
| 2019/0349212 | A1* | 11/2019 | Heins | H04L 12/1831 |
| 2020/0135050 | A1* | 4/2020 | Monge Nunez | G10L 25/60 |
| 2020/0244380 | A1* | 7/2020 | Agrawal | G06F 3/0482 |
| 2020/0251006 | A1* | 8/2020 | Sharma | G06N 5/041 |
| 2021/0076002 | A1* | 3/2021 | Peters | G06V 40/20 |
| 2021/0090576 | A1* | 3/2021 | Salazar | G10L 25/66 |

OTHER PUBLICATIONS

Dermody et al., "A Multimodal Positive Computing System for Public Speaking", In Proceedings of the 13th International Joint Conference on Computer Vision, Imaging and Computer Graphics Theory and Applications, VISIGRAPP 2018, vol. 2: HUCAPP, copyright © 2018 by SCITEPRESS, pp. 38-43.

Tanveer et al., "Rhema: A Real-Time In-Situ Intelligent Interface to Help People with Public Speaking", IUI 2015, Mar. 29-Apr. 1, 2015, Atlanta, GA, © 2015 ACM, 10 pages.

* cited by examiner

MULTIMODAL NEURAL NETWORK FOR PUBLIC SPEAKING GUIDANCE

BACKGROUND OF THE INVENTION

The present invention relates generally to the field of machine learning, and more particularly to providing guidance to a public speaker byway of multimodal neural network analysis.

A deep neural network (DNN) is an artificial neural network (ANN) with multiple layers between the input and output layers. The DNN finds the correct mathematical manipulation to turn the input into the output, whether it be a linear relationship or a non-linear relationship. The network moves through the layers calculating the probability of each output. For example, a DNN that is trained to recognize dog breeds will go over the given image and calculate the probability that the dog in the image is a certain breed. The user can review the results and select which probabilities the network should display (above a certain threshold, etc.) and return the proposed label. Each mathematical manipulation as such is considered a layer, and complex DNN have many layers, hence the name "deep" networks.

SUMMARY

Embodiments of the present invention provide a method, system, and program product to provide guidance for public speaking. A processor retrieves speaker data regarding a speech made by a user. A processor separates the speaker data into one or more speaker modalities. A processor extracts one or more speaker features from the speaker data for the one or more speaker modalities. A processor generates a performance classification based on the one or more speaker features. A processor sends to the user guidance regarding the speech based on the performance classification.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
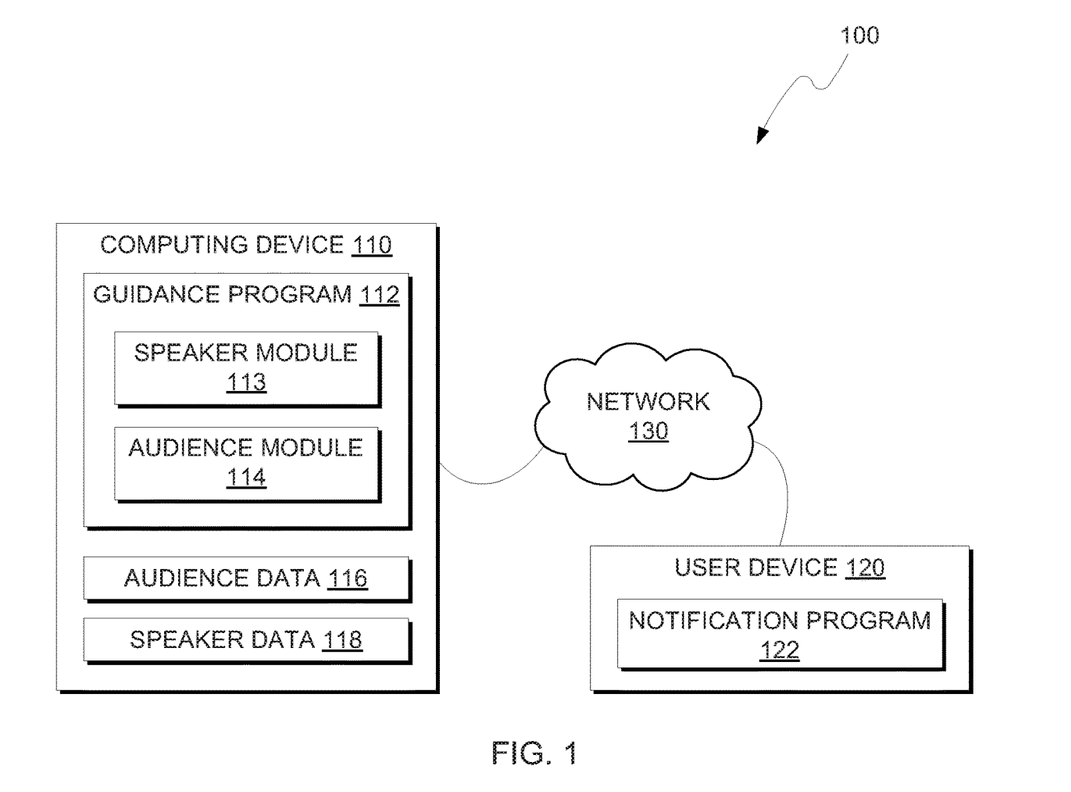
FIG. 1 is a functional block diagram illustrating a networked environment, in accordance with an exemplary embodiment of the present invention.

The present invention will now be described in detail with reference to the Figures. FIG. 1 is a functional block diagram illustrating networked environment, generally designated 100, in accordance with one embodiment of the present invention. Networked environment 100 includes computing device 110 and user device 120 connected over network 130. Computing device 110 includes guidance program 112, speaker module 113, audience module 114, audience data 116 and speaker data 118. User device 120 includes notification program 122.

In various embodiments of the present invention, computing device 110 and user device 120 are each a computing device that can be a standalone device, a server, a laptop computer, a tablet computer, a netbook computer, a personal computer (PC), or a desktop computer. In another embodiment, computing device 110 or user device 120 represent a computing system utilizing clustered computers and components to act as a single pool of seamless resources. In general, computing device 110 or user device 120 can be any computing device or a combination of devices with access to, speaker module 113, audience module 114, audience data 116 and speaker data 118 and is capable of executing guidance program 112 and notification program 122. Computing device 110 and user device 120 may include internal and external hardware components, as depicted and described in further detail with respect to FIG. 6.

In this exemplary embodiment, speaker module 113, audience module 114, audience data 116 and speaker data 118 are stored on computing device 110. Notification program 122 is stored on user device 120. However, in other embodiments, speaker module 113, audience module 114, audience data 116, speaker data 118 and notification program 122 may be stored externally and accessed through a communication network, such as network 130. Network 130 can be, for example, a local area network (LAN), a wide area network (WAN) such as the Internet, or a combination of the two, and may include wired, wireless, fiber optic or any other connection known in the art. In general, network 130 can be any combination of connections and protocols that will support communications between computing device 110 and user device 120, in accordance with a desired embodiment of the present invention.

In various embodiments, guidance program 112 determines a speaker's effectiveness or performance during a speech or other public speaking event and provides guidance on matters to improve or change to become more effective at public speaking. A speech may be any spoken text or dialogue a speaker may deliver to an audience. In some scenarios, the audience may be present, such as a speech given at a banquet or meeting. In other scenarios, the audience may view the speech remotely such as with a broadcast or livestream of the speech. One of ordinary skill in the art will appreciate that the speech may be delivered at any venue through any medium without deviating from the invention.

In various embodiments, guidance program 112 retrieves, receives, collects or is otherwise provided audience data 116 and speaker data 118. Speaker data 118 includes audio and visual data of the speaker during delivery of the speech. Audience data 116 includes audio and visual data of the at least one audience member during delivery of the speech. In various embodiments, a speaker is recorded, both audibly and visually, and stored in speaker data 118. In conjunction, one or more members of the audience are also recoded, both audibly and visually, and stored in audience data 116.

In some embodiments, audience data 116 may include environmental factors such as but not limited to, the location of the venue the speech (e.g., indoors, outdoors, etc.), temperature and light levels. One of ordinary skill in the art will appreciate that audience data 116 and speaker data 118 may also be provided for a speech after the speech was given without deviating from the invention. While the following discusses embodiments where guidance is given during the delivery of a speech in real-time, additional embodiments of the invention may be provided where guidance program 112 analyzes speaker data 118 and audience data 116 after the speech is given or recorded.

In various embodiments, guidance program 112 includes deep-learning, multimodal neural networks used to identify and determine various classifications of features present in either audience data 116 or speaker data 118, with speaker module 113 classifying speaker data 118 and audience module 114 classifying audience data 116. Neural networks are models that comprises a variety of nodes or "neurons". Typically, neural networks are divided into three layers, an input layer, an output layer and a hidden layer. The input and output layer provide mechanisms to receive input and provide outputs, while the hidden layer interconnects both input and output layers to determine and provide the machine-learning and classification of the neural network. Multimodal neural networks are neural networks whose hidden layers are separated into categories, or modes, prior to connection to the output layer or another hidden layer of the neural network.

Figure 3:
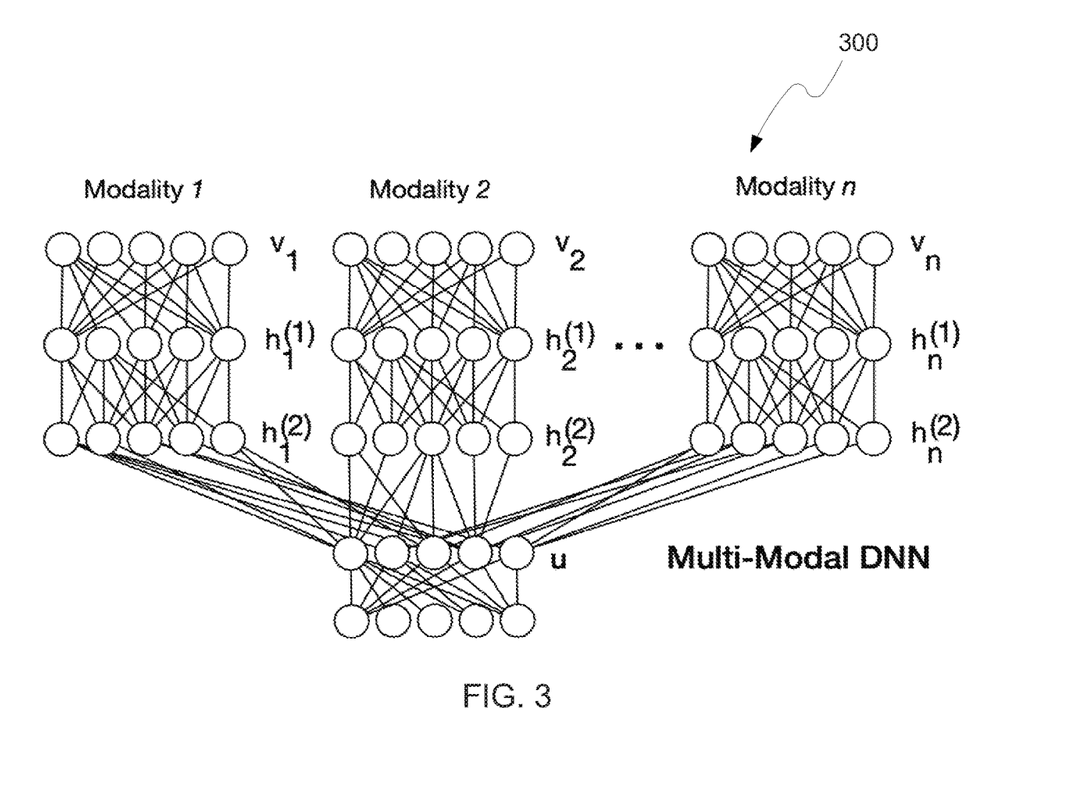
FIG. 3 depicts an example multimodal neural network.

FIG. 3 depicts an example multimodal deep-learning neural network (DNN), generally designated 300. In Multimodal DNN 300 $v_n$ is the input layer and u is the output layer. The input layer is provided to each hidden layer, h(n), based on the number of modalities, n. During training, guidance program 112 determines and changes the interconnects between each layer, v, h and u. In general, each mode of the modalities of the multimodal DNN 300 are kept to a "sensor" specific domain before connecting the network with the next layer. In neural network the term "sensor" represents the inferences and inputs that may be "sensed" and that effect the output layer and not necessarily direct input from a sensor device.

Referring back to FIG. 1, example modalities for audience data 116 include, but are not limited to, the following domains: Auditory Feedback, Posture Feedback, Expression Feedback, and Environment Feedback. Auditory Feedback includes data that represent audience responses such as laughter, jeering, and the like. Posture Feedback includes data that represent audience posture and positioning, such as standing ovations and the like. Expression Feedback data sensors that represent audience members facial expressions. Environment Feedback includes data that represent environmental factors that may impact a speeches delivery such as, but not limited to, temperature, location (e.g., indoors versus outdoors), and speaker visibility, such as lighting.

Example modalities for speaker data 118 include, but are not limited to, the following domains: Body Language, Speech Content, Speech Intonation, and Speaker's Expression. Body Language includes data that represent eye contact, hand gestures, or posture of the speaker. Speech Content includes data that represent semantic content of the speech. Speech Intonation includes data that represent the tone or inflection used during the speech. Speaker's Expression includes data that represent the speaker's facial expressions exhibited during the speech.

In various embodiments, guidance program 112 provides guidance to a user giving a speech. Both audience data 116 and speaker data 118 are collected as the speech is being delivered by a user. Based on the multimodal neural networks provided by speaker module 113 and audience module 114, guidance program 112 determines guidance or suggestions to provide to the speaker in order to increase the effectiveness of the speech being given. In some embodiments, the speaker has access to computing device 110, and guidance program 112 provides auditory or visual output directly to the speaker. In other embodiments, the speaker has access to user device 120. For example, user device 120 may be a mobile device that the speaker carries during the speech or places at a podium. In such scenarios, guidance program 112 sends guidance to notification program 122 of user device 120 which, in turn, provides guidance to the speaker.

In various embodiments, guidance program 112 provides guidance to a speaker. Example guidance includes, but is not limited to, changes in posture, changes in gesturing, changes in intonation, changes in facial expressions, or changes in the speech's content. Based on the multimodal DNN provided by both speaker module 113 and audience module 114, guidance program 112 determines guidance based on audience data 116 and speaker data 118. As both speaker module 113 and audience module 114 are trained, guidance program 112 provides relevant guidance to the speaker that may improve the speeches effectiveness.

In various embodiments, improvements to the accuracy of the multimodal DNNs of speaker module 113 and audience module 114 are provided. By adapting or changing the multimodal DNNs of speaker module 113 and audience module 114, guidance program 112 improves the accuracy or error rate of the multimodal DNNs of speaker module 113 and audience module 114. This process is often referred to as learning or training. In some scenarios, guidance program 112 includes a supervised learning mode. Supervised learning is a process of training a machine-learning model based on corrections or input from a user (i.e., the user is supervising the learning process). In such scenarios, guidance program 112 is provided a recorded or live speech of both, or separately, audience data 116 and speaker data 118. A user provides classifications of features provided in the recorded speech (e.g., "good posture" at one time and "bad posture" at another time). The multimodal DNNs of speaker module 113 and audience module 114 also provide a classification of portions of the recorded speech. If classification of the supervised learning and the multimodal DNNs differ, an error is said to occur. In such instances, guidance program 112 adjusts the multimodal DNNs such that the classifications match. Once the number of errors between the supervised learning is below a threshold, guidance program 112 has completed training of the the multimodal DNNs.

In other scenarios, guidance program 112 provides unsupervised training of the multimodal DNNs of speaker module 113 and audience module 114. Unsupervised training is a machine learning process where guidance program 112 is not provided classification by users for training, but instead relies on machine-derived classification for training. Considering that the audience's reaction, and by extension audience data 116, is in response to the speech being delivered (i.e., speaker data 118 influences the audience data 116), guidance program 112 performs unsupervised training of the multimodal DNNs of speaker module 113 and audience module 114. If a negative or otherwise undesirable feature is detected in audience data 116, yet the multimodal DNNs of speaker module 113 does not indicate and guidance, then, in some scenarios, guidance program 112 adjusts the multimodal DNNs of speaker module 113. One of ordinary skill in the art will appreciate that the multimodal DNNs of speaker module 113 and audience module 114 may be trained using any methodology or technique without deviating from the invention.

In various embodiments, guidance program 112 generates a unique multimodal DNNs for speaker module 113 or audience module 114. For example, guidance program 112 may retrieve a multimodal DNNs corresponding to the speaker. In this example, the multimodal DNNs corresponding to the speaker have been uniquely trained to previous speeches made by a particular user. Furthermore, multimodal DNNs for audience module 114 may have separately trained DNNs for different audience types or venues (e.g., one multimodal DNN for banquets or small speaking engagements and another multimodal DNN for larger venues). In such embodiments, guidance program 112 receives input from a user to select a particular speaker-trained DNNs or venue-trained DNNs.

Figure 2:
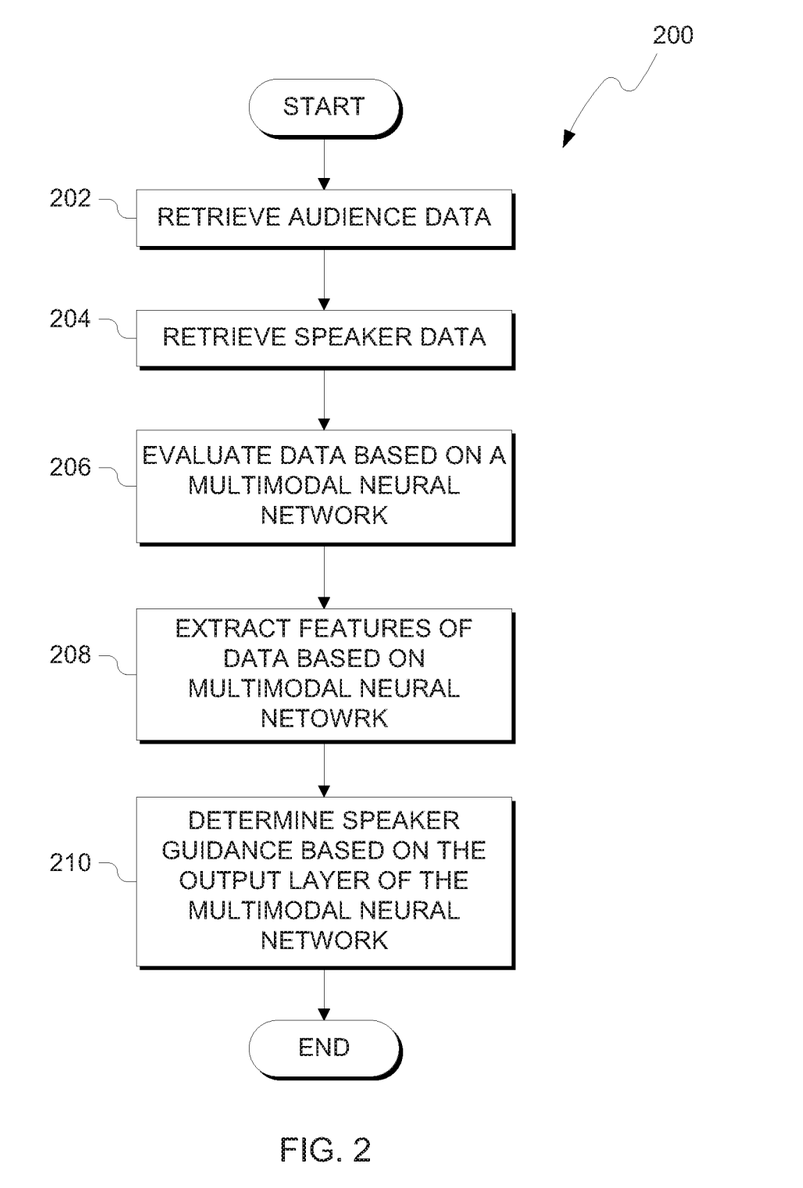
FIG. 2 illustrates operational processes of a guidance program, on a computing device within the environment of FIG. 1, in accordance with an exemplary embodiment of the present invention.

FIG. 2 illustrates operational processes, generally designated 200, of guidance program 112. In process 202, guidance program 112 retrieves audience data 116. In some scenarios, audience data 116 is a real-time or close to real-time recording of the audience reacting to a speech. In some scenarios, audience data 116 is a previously-recorded reaction to a speech. In some scenarios, guidance program 112 does not utilize audience data 116 and only utilizes speech-related information from speaker data 118 (process 204). In process 204, guidance program 112 retrieves speaker data 118. In some scenarios, speaker data 118 is a real-time or close to real-time recording a speech provided by a speaker. In other scenarios, speaker data 118 is a previously-recorded speech.

Figure 4:
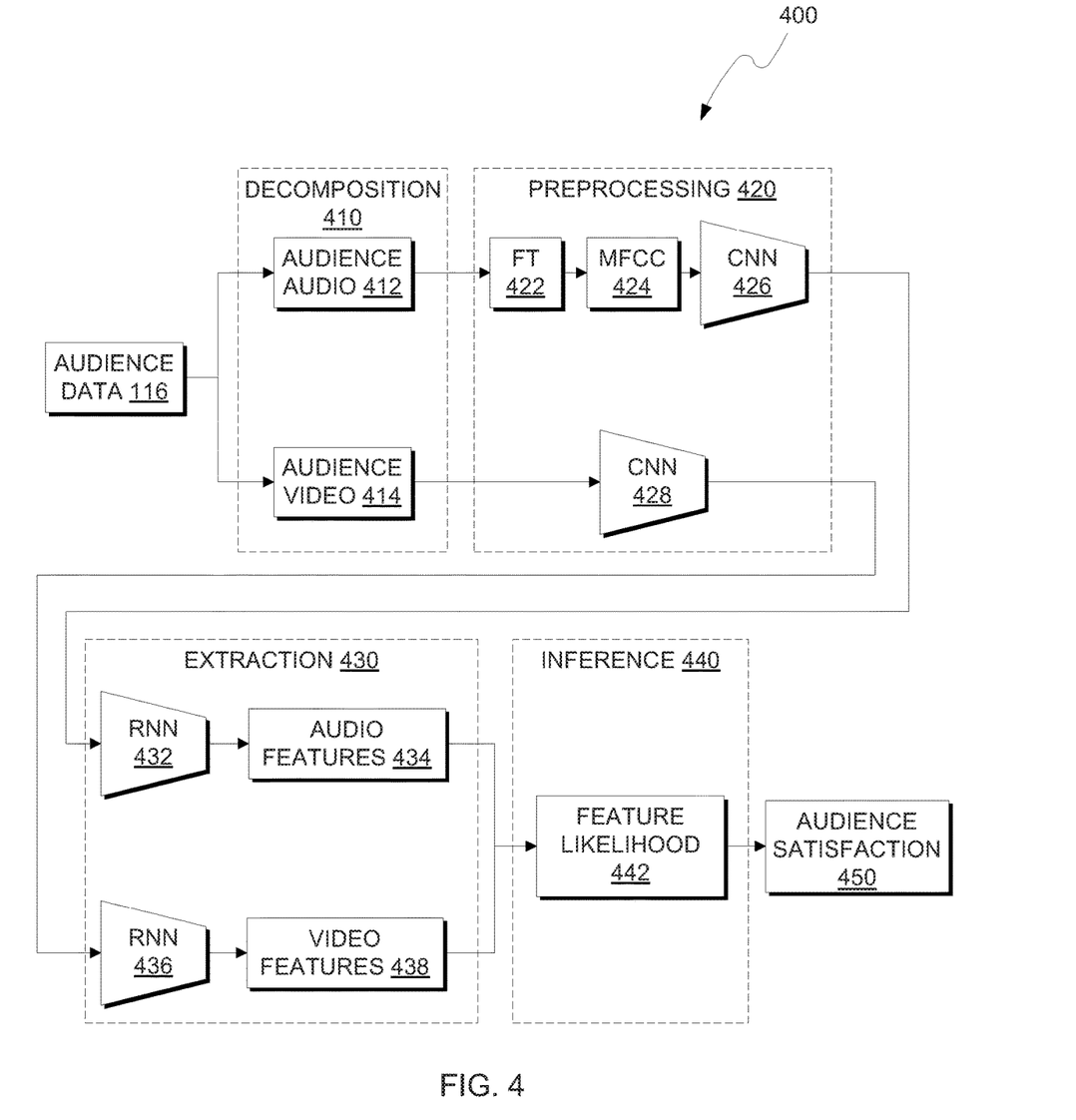
FIG. 4 illustrates a flow diagram of multimodal audience neural network.
Figure 5:
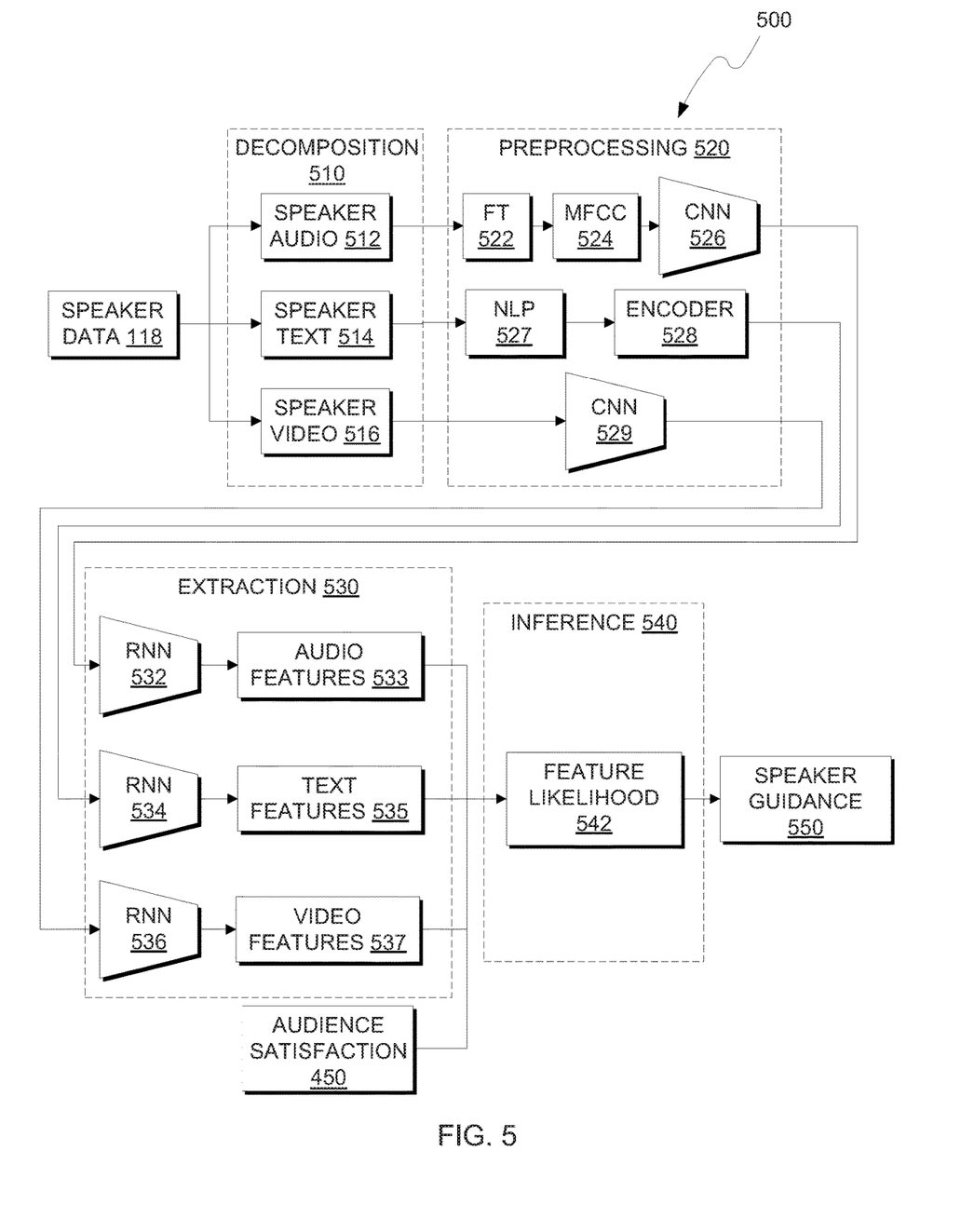
FIG. 5 illustrates a flow diagram of multimodal speaker neural network.

In process 206, guidance program 112 evaluates the retrieved data in processes 202 and 204 based on the multimodal DNNs provided by speaker module 113 or audience module 114. FIG. 4 illustrates the processes, generally designated 400, of evaluating audience data 116 with multimodal DNNs. FIG. 5 illustrates the processes, generally designated 500, of evaluating speaker data 118 with multimodal DNNs.

In process 208, guidance program 112 determines likely features of audience data 116 and speaker data 118. Based on the output of the multimodal DNNs provided by speaker module 113 or audience module 114, guidance program 112 determines likely features that are present in the recorded speech by the speaker, as well as the likely features exhibited by the audience, as presented by audience data 116 and speaker data 118. In process 210, guidance program 112 provides guidance to the speaker. If an undesired feature is determined to be present in either audience data 116 or speaker data 118, then guidance program 112 provides guidance to the speaker to counter the undesired feature. For example, guidance program 112 identifies a poor posture feature in speaker data 118. In response, guidance program 112 provides guidance to the speaker to improve posture. As another example, guidance program 112 identifies a negative reaction from audience data 116. Guidance program 112 also identifies an undesired feature in speaker data 118, where the speaker was gesturing heavily in a recent part of the speech. In response, guidance program 112 provides guidance to the speaker to limit gesturing.

FIG. 4 illustrates a flow diagram, generally designated 400, of a multimodal audience neural network provided by audience module 114. Audience data 116 is provided to audience module 114. In decomposition 410, audience module 114 separates audience data 116 into audience audio 412 and audience video 414. Both audience audio 412 and audience video 414 are separated into different modalities of the audience neural network, with separate input layers provided by preprocessing 420 for each modality. Preprocessing 420 prepares each input modality for the respective input layers, convolutional neural network (CNN) 426 and CNN 428. Fourier Transform (FT) 422 separates the audio into frequency components for analysis. For example, FT 422 performs a Fast Fourier Transform (FFT) to audience audio 412 into a frequency domain representation of audience audio 412. Additionally, audience module 114 determines one or more mel-frequency cepstrum coefficients (MFCC) 424 for the frequency domain representation of audience audio 412. MFCC 242 provide equal spacing of frequency power coefficients to better model human hearing when compared to other linear power coefficient models. Audience module 114 provides the power coefficients in the frequency domain of audience audio 412 to an input layer of the neural network, CNN 426.

CNN 426 is a convolutional neural network that initially connects one layer to the all layers in the next layer, either as a hidden or output layer of CNN 426. Between each layer, the results of each connection to the following layer are convoluted with each other to determine how the much the previous layer impacts the following layer. CNN 426 as well as other convolutional neural networks, help establish correlations and relationships in the Multimodal DNNs of audience module 114, as well as speaker module 113 as discussed herein.

Audience video 414 includes frames extracted frames from video of the audience, which provides to the extracted frames in the input layer of CNN 428. In some embodiments, each frame of video from audience video 414 is extracted. In other embodiments, frames at longer intervals are extracted (e.g., one frame for each second of video) in order to reduce the amount of data processed by CNN 428.

Both CNN 426 and CNN 428 modalities are connected to another layer of the multimodal neural network, recurrent neural network (RNN) 432 and RNN 436 of extraction 430. Recurrent neural networks provide propagation between layers based on a temporal basis to detect features over time. Based on the output layer of RNN 432 and RNN 436, audio features 434 and video features 438 are extracted. Inference 440 includes feature likelihood 442 which identifies likely features of the audience data 116 as presented in both audience audio 412 and audience video 414. For example, the extracted features in audio features 434 and video features 438 and using an output layer of a neural network such as a softmax function. The softmax function is an operation that determines a normalized distribution of features identified (i.e., audio features 434 and video features 438) such that each feature can then be equally compared and ranked. Based on the ranking of features, the audience module provides an audience satisfaction 450 metric that represents the enjoyment or displacement of the audience during the speech.

FIG. 5 illustrates a flow diagram, generally designated 500, of multimodal speaker neural network. As with audience module 114, the multimodal DNN of speaker module 113 comprises a similar process. Decomposition 510 separates speaker data 118 into speaker audio 512 and speaker video 516. Additionally, speaker text 514 is generated from speaker data. Based on speaker audio 512, the contents of the speech presented in speaker data 118 are determined. In preprocessing 520, speaker audio 512 is transformed to the frequency domain by FT 522 and assigned power coefficients by MFCC 524, which a provided to the input layer of CNN 526. Speaker video 516 is provided to the input layer of CNN 529. Speaker text 514 is passed to natural language processing (NLP) 527 module to determine the content of the speech. In some embodiments, sentiment analysis is included in NLP 527 to determine the intended meaning of the speech as well. Encoder 528 takes the text and other information generated by NLP 527 to prepare the information for feature extraction.

In extraction 530, the processed speaker audio 512, speaker text 514 and speaker video 516 are provided to each respective RNN 532, 534 and 536, which in turn extract features into audio features 533, text features 535 and video features 537. In inference 540, the identified features are provided to feature likelihood 542 that identifies likely features presented in audio features 533, text features 535 and video features 537. Additionally, audience satisfaction 450 is provided to feature likelihood 542 to determine correlations between the speaker and the audience's reception of the speech. Based on the likely features of the speech and speaker, speaker module 113 provides speaker guidance 550 as discussed herein.

Figure 6:
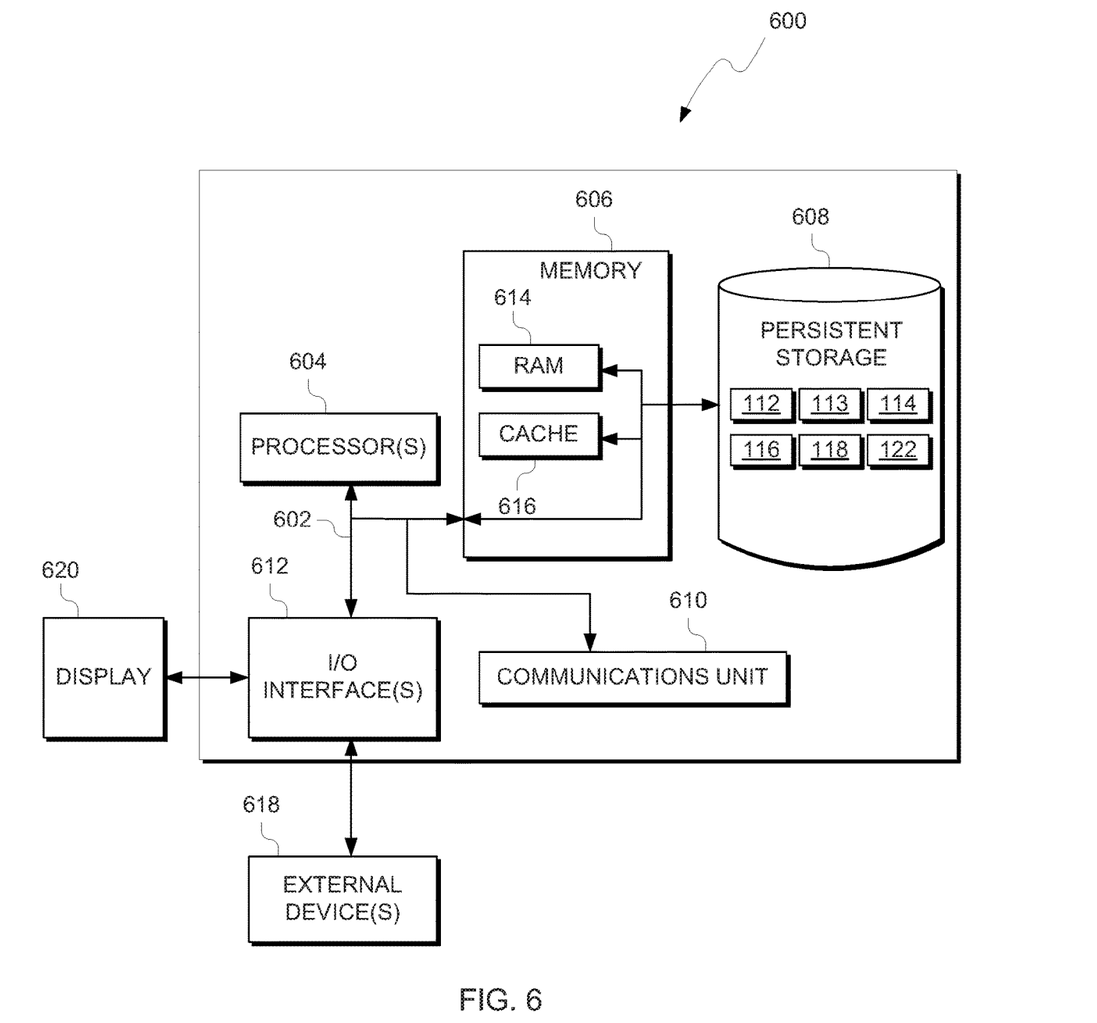
FIG. 6 depicts a block diagram of components of the computing device executing a guidance program, in accordance with an exemplary embodiment of the present invention.

FIG. 6 depicts a block diagram, 600, of components of computing device 110 and user device 120, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Computing device 110 and user device 120 each include communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 614 and cache memory 616. In general, memory 606 can include any suitable volatile or non-volatile computer-readable storage media.

Speaker module 113, audience module 114, audience data 116, speaker data 118 and notification program 122 are stored in persistent storage 608 for execution and/or access by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 610, in these examples, provides for communications with other data processing systems or devices, including resources of network 130. In these examples, communications unit 610 includes one or more network interface cards. Communications unit 610 may provide communications through the use of either or both physical and wireless communications links. Speaker module 113, audience module 114, audience data 116, speaker data 118 and notification program 122 may be downloaded to persistent storage 608 through communications unit 610.

I/O interface(s) 612 allows for input and output of data with other devices that may be connected to computing device 110 and user device 120. For example, I/O interface 612 may provide a connection to external devices 618 such as a keyboard, keypad, a touch screen, and/or some other suitable input device. External devices 618 can also include portable computer-readable storage media such as, for example, thumb drives, portable optical or magnetic disks, and memory cards. Software and data used to practice embodiments of the present invention, e.g., speaker module 113, audience module 114, audience data 116, speaker data 118 and notification program 122, can be stored on such portable computer-readable storage media and can be loaded onto persistent storage 608 via I/O interface(s) 612. I/O interface(s) 612 also connect to a display 620.

Display 620 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method comprising:
retrieving, by one or more processors, speaker data regarding a speech made by a user;
separating, by the one or more processors, the speaker data into one or more speaker modalities;
extracting, by the one or more processors, one or more speaker features from the speaker data for the one or more speaker modalities;
extracting, by the one or more processors, one or more audience features from audience data gathered in association with the speech made by the user;
generating, by the one or more processors, an audience classification of the one or more audience features;
generating, by the one or more processors, a first performance classification based on a multimodal deep-learning neural network, wherein each of the one or more speaker modalities and each of the one or more audience features are connected to a respective input layer of a respective neural network for the multimodal deep-learning neural network the one or more speaker features and the audience classification;
in response to the first performance classification indicating positive performance by the user while at least one of the one or more audience features indicating negative performance by the user, retraining, by the one or more processors, the multimodal deep-learning neural network with the one or more audience features indicating negative performance by the user; and
generating, by the one or more processors, a second performance classification regarding a second speech based on the retrained multimodal deep-learning neural network.

2. The method of claim 1, wherein the speaker modalities include one or more of the following modalities of a multimodal neural network: speech audio modal, speech text modal, speech video modal, speaker body language modal, speech content modal, speech intonation modal, and speaker expression modal.

3. The method of claim 1, wherein the one or more audience features are separated into one or more of the following modalities of a multimodal neural network: audience audio modal, audience video modal, audience auditory feedback modal, audience posture feedback modal, audience expression feedback modal, and environment feedback modal.

4. A computer program product comprising:
one or more computer-readable storage media and program instructions stored on the one or more computer-readable storage media, the program instructions comprising:
program instructions to retrieve speaker data regarding a speech made by a user;
program instructions to separate the speaker data into one or more speaker modalities;
program instructions to extract one or more speaker features from the speaker data for the one or more speaker modalities;
program instructions to extract one or more audience features from audience data gathered in association with the speech made by the user;
program instructions to generate an audience classification of the one or more audience features;
program instructions to generate a first performance classification based on a multimodal deep-learning neural network, wherein each of the one or more speaker modalities and each of the one or more audience features are connected to a respective input layer of a respective neural network for the multimodal deep-learning neural network;
in response to the first performance classification indicating positive performance by the user while at least one of the one or more audience features indicating negative performance by the user, program instructions to retrain the multimodal deep-learning neural network with the one or more audience features indicating negative performance by the user; and
program instructions to generate a second performance classification regarding a second speech based on the retrained multimodal deep-learning neural network.

5. The computer program product of claim 4, wherein the speaker modalities include one or more of the following modalities of a multimodal neural network: speech audio modal, speech text modal, speech video modal, speaker body language modal, speech content modal, speech intonation modal, and speaker expression modal.

6. The computer program product of claim 4, wherein the one or more audience features are separated into one or more of the following modalities of a multimodal neural network: audience audio modal, audience video modal, audience auditory feedback modal, audience posture feedback modal, audience expression feedback modal, and environment feedback modal.

7. A computer system comprising:
one or more computer processors;
one or more computer readable storage media; and
program instructions stored on the computer readable storage media for execution by at least one of the one or more processors, the program instructions comprising:
program instructions to retrieve speaker data regarding a speech made by a user;
program instructions to separate the speaker data into one or more speaker modalities;
program instructions to extract one or more speaker features from the speaker data for the one or more speaker modalities;
program instructions to extract one or more audience features from audience data gathered in association with the speech made by the user;
program instructions to generate an audience classification of the one or more audience features;
program instructions to generate a first performance classification based on a multimodal deep-learning neural network, wherein each of the one or more speaker modalities and each of the one or more audience features are connected to a respective input layer of a respective neural network for the multimodal deep-learning neural network;
in response to the first performance classification indicating positive performance by the user while at least one of the one or more audience features indicating negative performance by the user, program instructions to retrain the multimodal deep-learning neural network with the one or more audience features indicating negative performance by the user; and
program instructions to generate a second performance classification regarding a second speech based on the retrained multimodal deep-learning neural network.

8. The computer system of claim 7, wherein the speaker modalities include one or more of the following modalities of a multimodal neural network: speech audio modal, speech text modal, speech video modal, speaker body language modal, speech content modal, speech intonation modal, and speaker expression modal.

9. The computer system of claim 7, wherein the one or more audience features are separated into one or more of the following modalities of a multimodal neural network: audience audio modal, audience video modal, audience auditory feedback modal, audience posture feedback modal, audience expression feedback modal, and environment feedback modal.

* * * * *